United States Patent [19]

Gandini et al.

[11] 4,335,446

[45] Jun. 15, 1982

[54] TERMINAL EQUIPMENT FOR DATA-TRANSMISSION NETWORK INCLUDING DIGITALLY OPERATING MODEM

[75] Inventors: Francesco Gandini, Turin; Giuseppe Giandonato, Rivalba-Turin; Enrico Impallomeni; Roberto Montagna, both of Turin, all of Italy

[73] Assignee: CSELT - Centro Studi e Laboratori Telecomunicazioni S.p.A., Turin, Italy

[21] Appl. No.: 100,908

[22] Filed: Dec. 6, 1979

Related U.S. Application Data

[63] Continuation of Ser. No. 902,164, May 2, 1978, abandoned.

[30] Foreign Application Priority Data

May 2, 1977 [IT] Italy .............................. 67967 A/77

[51] Int. Cl.$^3$ ....................... H04B 12/00; G06F 7/48
[52] U.S. Cl. ...................................... 364/900; 375/95
[58] Field of Search ... 364/200 MS File, 900 MS File; 375/52, 56, 57, 83, 84, 94, 22, 80, 81, 82, 95

[56] References Cited

U.S. PATENT DOCUMENTS

| | | | |
|---|---|---|---|
| 3,825,905 | 7/1974 | Allen, Jr. .............................. | 364/200 |
| 4,003,032 | 1/1977 | Austin et al. ......................... | 364/200 |
| 4,085,449 | 4/1978 | Walsh et al. ......................... | 364/900 |

*Primary Examiner*—Gareth D. Shaw
*Assistant Examiner*—Thomas M. Heckler
*Attorney, Agent, or Firm*—Karl F. Ross

[57] ABSTRACT

At a subscriber station AU communicating with a central office of a data network, a logic unit UM includes a processing subunit UE which, under the control of a microprogrammed subunit UC comprising a microinstruction memory MM and a sequencer SQ, digitally demodulates an incoming carrier and synthesizes an outgoing carrier modulated in the DPSK (differential-phase-shift keying) mode. The modulation is effected by multiplying stored bits of an outgoing signal, read out from a data memory MD, with bits representing digitized sine and cosine samples of the carrier wave obtained from a calculator AL within subunit UE, followed by conversion to analog form and filtering; demodulation is carried out in a similar manner, after conversion of analog samples of the incoming carrier to digital form, by multiplying the resulting bits with those of the calculated sine and cosine samples. The sampling instants are established by a timing signal T2 digitally synchronized with the central-office clock through a phase-locking loop including an adjustable frequency divider DP controlled by an error signal from the calculator AL, emitted when the peak-indicating derivative sample has an absolute value exceeding a predetermined threshold.

7 Claims, 4 Drawing Figures

4,335,446

TERMINAL EQUIPMENT FOR DATA-TRANSMISSION NETWORK INCLUDING DIGITALLY OPERATING MODEM

This is a continuation of application Ser. No. 902,164, filed May 2, 1978, abandoned.

FIELD OF THE INVENTION

Our present invention relates to data transmission and more particularly to a microprogrammed unit designed as a modulator/demodulator (MODEM) in integrated data-circuit-terminating equipment (DCE).

BACKGROUND OF THE INVENTION

At present, data transmission employs mainly the existing telephone network and is carried out by utilizing lines switched by conventional telephone exchanges as well as direct lines serving for point-to-point communication.

As telephone networks are not originally intended for data traffic, their hybrid utilization does not enable optimal data transmission from the viewpoint of either quantity or maintenance costs.

More particularly, the following disadvantages are encountered:

considerable limitation of the data-transmission speed;
long times in establishing the connection;
greater error ratios.

To overcome these disadvantages, a Public Data Network has been internationally recommended by CCITT (International Telegraph and Telephone Consultative Committee). The principal features of this network are as follows:

(1) High transmission speed.
(2) Brief times for establishing the connection.
(3) Assurance of very low error rate.
(4) Utilization of wholly digital networks employing for transmission, as well as for signaling, envelopes (formats) generally consisting of 8 bits, six of which relate to information and originate at the subscriber station while two bits are for service and are synchronously added to the data stream generated by the subscriber. The in-line transmission speed (gross bit rate) equals 4/3 times the standard subscriber's speed (net bit rate).
(5) Beaseband connection between subscriber-side DCE and the exchange.

The baseband connection is economically advantageous since it is known that a baseband modem is less complicated and expensive than a modem operating in the speech band, which is able to transmit only on a conventional voice channel (300–3,400 Hz).

A baseband connection, however, is not possible when the subscriber is separated from the nearest exchange by a considerable distance, e.g. more than 10 km, because line attenuation of data signals becomes excessive for such long distances. On the other hand, if the inconvenience of line attenuation is overcome by the insertion of intermediate regenerators, the system becomes very costly.

Moreover, a branched network designed for data transmission and operating in baseband, able to serve all subscribers, does not currently exist. This means that at present only subscribers very near the exchange could use the service suggested by CCITT for the Public Data Network.

If a remote subscriber connected to a conventional speech-band channel uses a net rate of, say, 2,400 bits per second, the expensive speech-band modems must operate in line, according to CCITT Recommendations, at a gross bit rate equal to 4/3 times the net rate, i.e. at 3,200 bit/sec; modems of this type designed to operate at that rate are not yet commercially available.

OBJECTS OF THE INVENTION

The general object of our present invention is to provide a microprogrammed unit which solves these problems and enables even remote subscribers to be connected to the data network by means of conventional telephone channels, thereby offering the network service to all telephone subscribers regardless of their location.

A more particular object of the invention is to provide a microprogrammed unit able to operate as a data-signal modem and also as DCE according to CCITT International Recommendations X.21 and X.21 bis.

SUMMARY OF THE INVENTION

Terminal equipment according to our invention, communicating with a data network by way of a transmission link designed for a carrier wave modulated by a succession of binary signals (referred to hereinafter as symbols), especially bit pairs or dibits, comprises receiving means for deriving a succession of analog samples at predetermined intervals from an incoming modulated carrier wave, these samples being translated into digitized form by a conventional analog/digital converter. Each binary signal occurs during a time period of predetermined length encompassing a multiplicity of sampling intervals (five in the embodiment described hereinafter). Digital values of trigonometric functions (sine and cosine) of a predetermined carrier oscillation, taken at respective sampling intervals, are stored in a memory from which they are read out, together with the digitized samples from the converter, to arithmetic means controlled by a microinstruction emitter and designed to demodulate the incoming carrier wave by performing mathematical operations on these digitized samples, including multiplication thereof by the stored digital values to produce a series of signal samples during each symbol period, and reconstructing the original symbols from the results of these operations by selecting during each symbol period the symbol sample of highest absolute value in the series.

The microinstruction emitter stepped by a timing pulse generator, is programmed to control the detection of a characteristic bit among the reconstituted binary signals or symbols, such bit occurring in a predetermined time position of a multibit envelope consisting of a predetermined number of modulating symbols. The timing-pulse generator advantageously comprises an adjustable frequency divider to which an error signal may be applied for varying its step-down ratio in order to resynchronize the microprogram with the timing of the associated data network.

The arithmetic means may include a calculator with a feedback connection extending to a read-and-write section of the memory, the latter also having a read-only section containing filtering coefficients in addition to the aforementioned stored digital values.

As more fully described hereinafter, the microinstruction emitter may be programmed to control the reconstruction of an original symbol by producing derivative samples, associated with respective original samples, from a comparison of nonconsecutive signal samples. One of the several samples obtained within a symbol period is selected for reconstruction purposes on the basis of an associated derivative sample bracketed by an immediately preceding and an immediately succeeding derivative sample of mutually opposite signs and of absolute magnitudes exceeding that of the intervening derivative sample. The aforementioned error signal can be derived from this intervening derivative sample with the aid of a threshold comparator included in the arithmetic means.

When the terminal equipment is part of a station also including a source of digitized symbols to be modulated upon an outgoing carrier wave, this source and the analog/digital converter may be alternately connected by a multiplexer to an input of a calculator forming part of the arithmetic means; with the calculator connected to the local source, its output signals can be translated into a modulated carrier wave by a digital/analog converter.

BRIEF DESCRIPTION OF THE DRAWING

These and other features of the present invention will now be described in detail with reference to the accompanying drawing in which.

SPECIFIC DESCRIPTION

Figure 1:
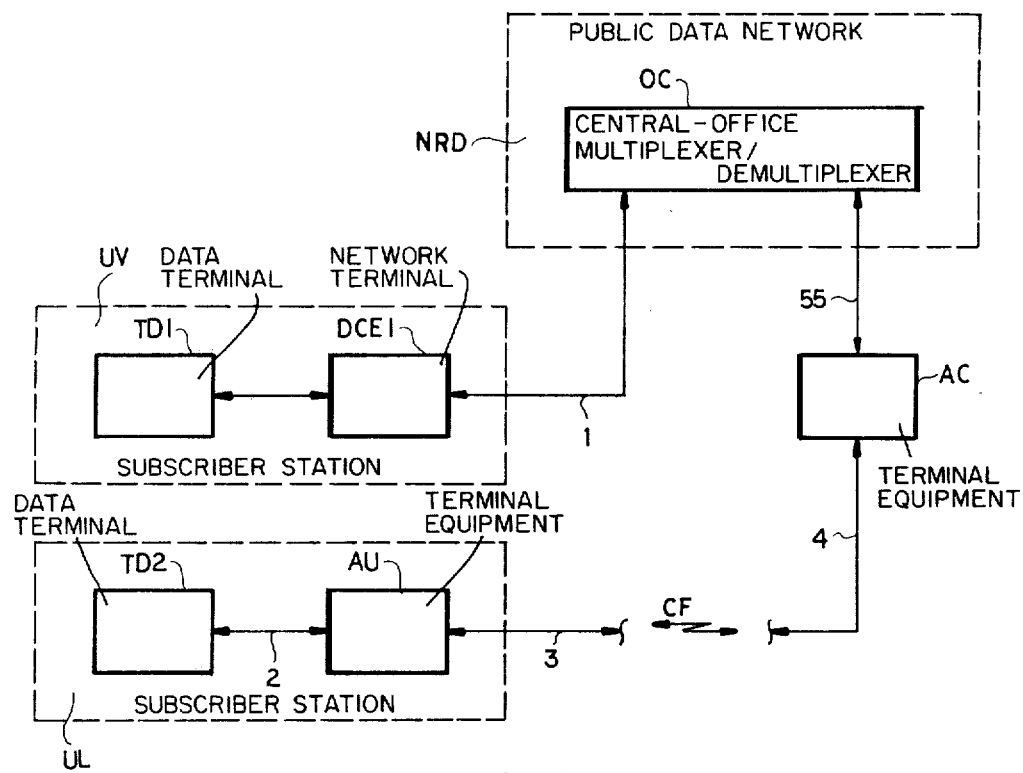
FIG. 1 is a block diagram of a public data network including subscriber's and exchange terminal equipment according to our invention.

In FIG. 1 we have indicated at NRD a data network comprising all the necessary switching and multiplexing devices of which only a conventional central-office unit OC, serving to multiplex or demultiplex on a single frame and data stream coming from several subscribers, has been illustrated.

Reference UV denotes a subscriber station geographically placed near unit OC; station UV includes the usual synchronous data-terminal equipment TD1 and network-terminal equipment DCE1.

Equipment TD1 is the subscriber's actual data source and may consist of any "intelligent" terminal, i.e. an electronic processor; equipment DCE1 acts as an interface between component TD1 and unit OC (to which it is linked by means of a baseband connection 1) as it adapts network signaling to the signaling to terminal TD1 and vice versa.

Reference UL denotes a subscriber station geographically far from unit OC; station UL includes synchronous data-terminal equipment TD2, analogous to equipment TD1, and subscriber's network-terminal equipment AU bidirectionally linked to data terminal TD2 by a connection 2. Component AU forms part of our present invention and will be described in detail hereinafter with reference to FIGS. 2 and 3.

The functions of component AU are those of an interface, analogous to those carried out by equipment DCE1 for subscriber station UV, as well as those of a modem necessary for speech-band transmission via a path consisting, for instance, of a pair of subscriber's telephone loops symbolized by a line 3, one or more FDM (frequency-division modulation) sections collectively designated CF, and a pair of exchange loops symbolized by a line 4.

Reference AC denotes exchange equipment according to our invention whose structure is similar to that of component AU and which will also be described in detail with reference to FIGS. 2 and 3.

The functions of component AC are those of a modem, analogous and complementary to those carried out by component AU, as well as those of an interface between the speech-band path 3, CF, 4 and the exchange unit OC linked to component AC by a connection 55; the interface operations of component AC do not include, as they do in component AU, any signalization processing but involve only the necessary electric signal matching.

More particularly, a bidirectional data stream and a timing signal pass from unit OC toward component AC via connection 55.

Devices TD1, TD2, DCE1, OC are well known in the art and, as they are of no specific relevancy to the present invention, need not be further described.

Figure 2:
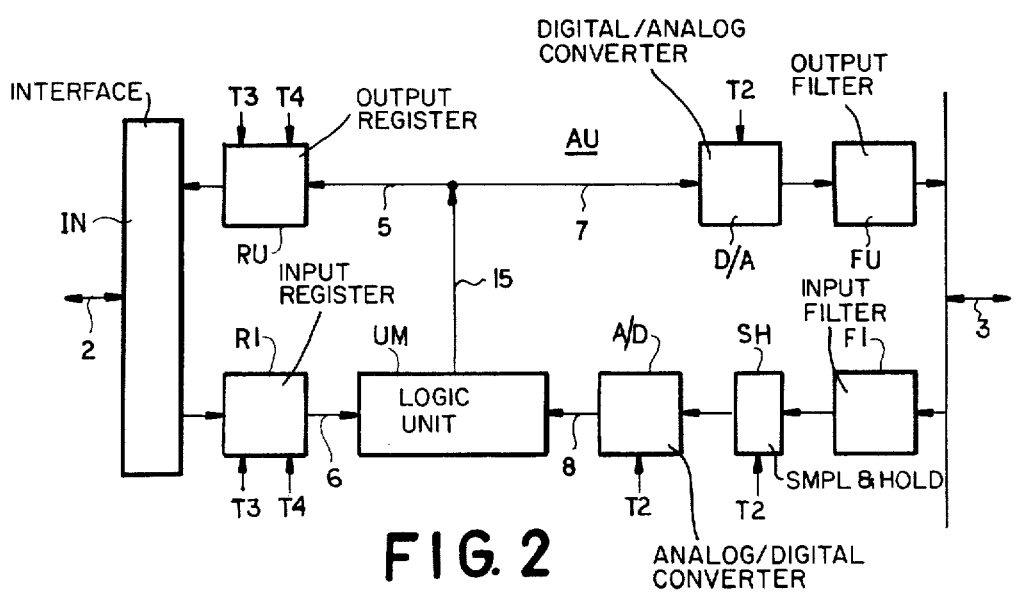
FIG. 2 is a block diagram showing details of the subscriber's terminal equipment included in FIG. 1.

In FIG. 2 reference IN denotes a conventional bidirectional interface circuit electrically matching, on the basis of the characteristics specified by CCITT Recommendations X.26 and X.27, the signals present on connection 2 generated or received by data terminal TD2 (FIG. 1), in such a way as to make them compatible with the electric characteristics required by signals which are to be processed by other blocks of subscriber's equipment AU.

An input register RI and an output register RU act as buffers and synchronizers of signals which pass therethrough. These registers are both timed by signals T3, T4 which will be examined hereinafter. Moreover, registers RI and RU carry out functions of parallel-series conversion as well as series-parallel conversion of the data they process.

Two conventional units D/A and A/D respectively perform digital-to-analog and analog-to-digital conversion. Reference SH denotes a conventional circuit for sampling and holding the analog signal coming from the line. Units D/A, A/D and SH are timed by a signal T2 which will also be examined hereinafter.

Two analog circuits FI and FU, interfacing with the telephone line 3, act as input and output channel filters, respectively.

Reference UM denotes a complex microprogrammed logic unit forming the core of component AU. Unit UM, which will be described in connection with FIG. 3, has an output line 15 connected to register RU and converter D/A via respective branches 5 and 7; input connections 6 and 8 respectively extend to it from register RI and converter A/D.

The block AC of FIG. 1 has the same structure as component AU, with the only difference that interface IN (FIG. 2) of block AU dialogues with terminal TD2 (FIG. 1) and thus operates at a net bit rate which is the standard subscriber's rate, while the corresponding interface in component AC dialogues with central-office equipment OC and thus operates at the gross bit rate of the data stream in network NRD.

Besides, while component AC receives the timing signals straight from the NRD exchange and is therefore directly controlled by the central-office clock, equipment AU extracts the synchronization from the data stream arriving over the path 4, CF, 3 and in turn synchronizes terminal TD2 so as to conform it to the central-office clock.

Equipment AU, accordingly, needs a phase-locking loop as discussed hereinafter in connection with FIG. 3, no such loop being required for block AC which therefore is of simpler structure.

Figure 3:
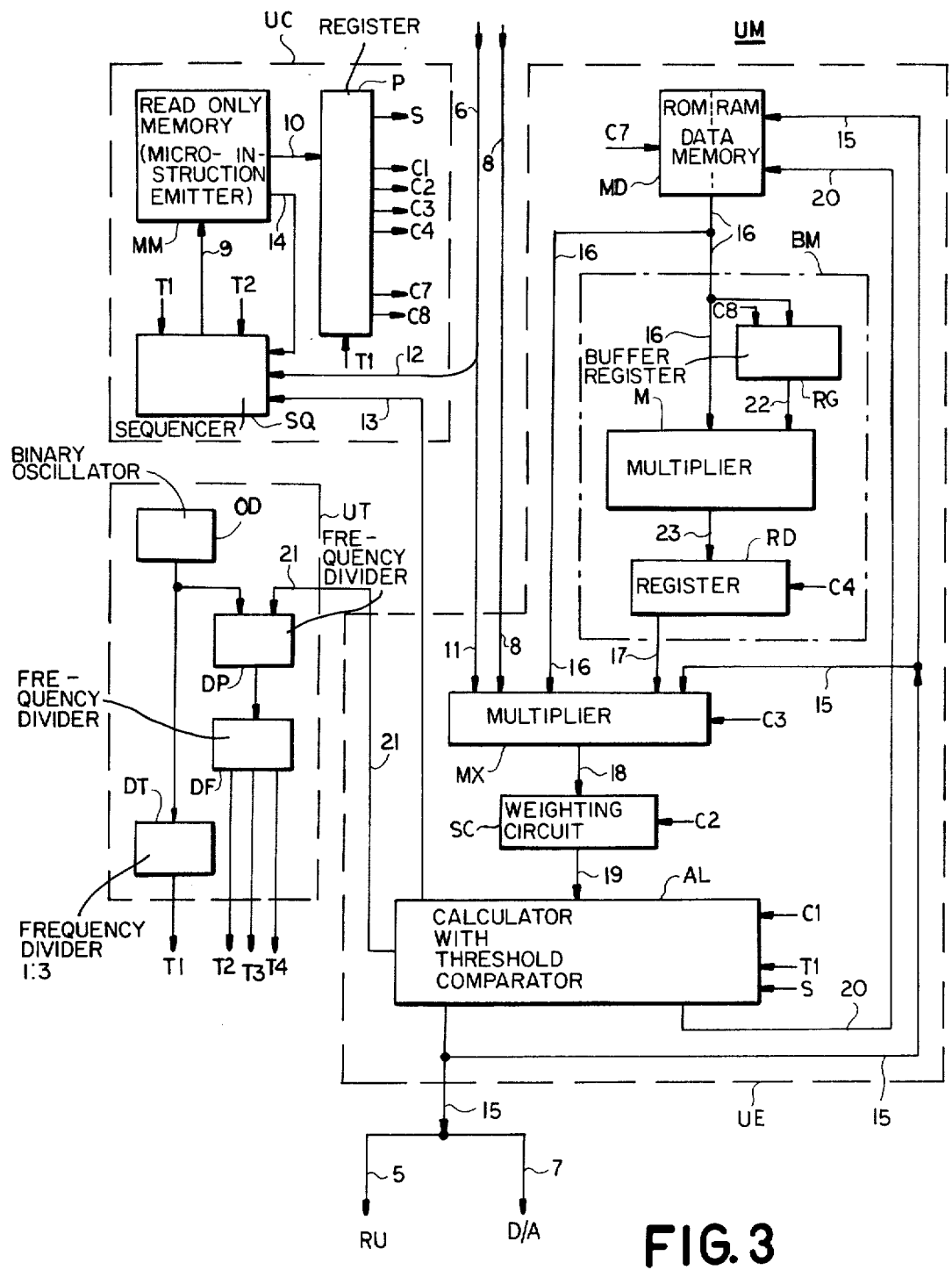
FIG. 3 is a more detailed block diagram of a logic unit shown in FIG. 2.

In FIG. 3 references UC, UE, UT denote a control subunit, a processing subunit and a timing subunit, respectively.

Control subunit UC comprises a read-only memory MM storing the ordered set of microinstructions necessary for the operation of the entire component AU (FIG. 2), as well as a sequencer SQ controlling the operative microinstruction sequence by supplying memory MM, via a connection 9, with the address of the microinstructions to be next executed; this address is determined by sequencer SQ on the basis of:

the address present at that moment on connection 9;

a portion of the present instruction, containing the address code, received by sequencer SQ from memory MM via a connection 14;

information relating to external events (signaling bits) coming from interface IN (FIG. 2) through register RI and connection 6;

the results of the processing operations in progress in subunit UE, these results being received by the sequencer as status information via a connection 13.

As clearly shown in FIG. 3, connection 6 coming from register RI is subdivided into a link 12, carrying the signalization portion to sequencer SQ, and a link 11 carrying the data portion of the bits present on connection 6.

The microinstruction read out from memory MM is subdivided into two parts respectively appearing on connections 10 and 14. More particularly, connection 10 carries the operating portion of this microinstruction which serves for the simultaneous parallel control of the remaining devices of unit UM; on connection 14 there is present the portion controlling the sequencing of the microinstructions utilized, as already described, by block SQ.

To transfer instructions from memory MM to subunits UE and UT, a register P is utilized which operates as a so-called "pipeline". Register P stores the instruction coming from memory MM for a time corresponding to a period of the operating cycle, measured by a signal T1, so as to make up for the delay caused by sequencer SQ in supplying the address to memory MM on connection 9 and for the access time of that memory, i.e. for the propagation delay between its inputs 9 and its outputs 10.

At the output of register P there are provided seven connections carrying configurations of command bits, denoted by C1, C2, C3, C4, C7, C8, and a binary signal S, forming a constant which is contained in each microinstruction, whose utilization will be described hereinafter.

Obviously the entire pattern of command bits at the output of register P exactly reproduces, except for the already discussed delay, the bit configuration present at its input connection 10.

Register P transfers and maintains at its output the bit configuration present on connection 10 at every leading edge of timing signal T1, which scans the operative cycle of the equipment.

Reference MX denotes a conventional multiplexer having five multiple inputs and one multiple output. The latter, comprising the same number of leads as each of its inputs, emits the bit configuration present at one of its five inputs in response to a selection command C3 which it receives from register P. Of the five inputs the first is connected to link 11, carrying the data portion of the bit configuration coming from register RI on connection 6; the second is tied to connection 8, coming from converter A/D, carrying the information arriving over line 3, CF, 4 (FIG. 1); the third is joined to a connection 16 carrying a piece of information coming from a data memory MD, which will be examined hereinafter; the fourth input is connected to a link 17 coming from a register RD, which will likewise be discussed below; the last input is connected to a line 15 carrying the bit configuration present at the output of subunit UE.

The output of multiplexer MX is connected, via a line 18, to a scaler or weighting circuit SC.

In response to a command C2 coming from register P, circuit SC performs on the bits received via connection 18 a leftward or rightward shift by a number of positions depending on the code contained in command C2. Thus, circuit SC acts as a conventional programmable divider or multiplier operating with a modulus equal to a power of two. Its function will be more fully explained hereinafter.

Reference AL denotes a logic-arithmetic network or calculator provided with a bank of addressable registers conventionally designed to carry out, on the basis of the timing signal T1, the necessary processing operations on the bit configuration received from circuit SC through a connection 19. Calculator AL receives also the following input signals:

the control code C1, read out from register P, consisting of a first portion specifying the kind of operation to be carried out by calculator AL and a second portion identifying the internal register of this calculator involved in such operation; and the binary signal S emitted by register P.

The outputs of calculator AL consist of:

connection 15, also shown in FIG. 2, which carries the data processed by subunit UE;

a connection 20 carrying the address for data memory MD;

the connection 13 supplying sequencer SQ with the aforementioned information determining the operation of memory MM;

finally, a wire 21 extending to timing subunit UT in order to supply a corrective signal to the portion of the phase-locking loop associated with this subunit.

In practice, network AL may be a commercially available logic-arithmetic computing unit for a microprocessor, provided it is sufficiently fast and versatile as to the utilization of its outputs and inputs; in technical language these microprocessors are referred to as of the "bit-slice" type.

The data memory MD includes a read-only (ROM) section and a write-and-read random-access (RAM) section.

The read-only section of memory MD contains, stored in its table, some constants to be utilized during the processing operation; the read-and-write section serves for temporary storing of the partial results of previous processing operations.

Memory MD receives via its input connection 20 the entire address-bit configuration and through connection 15 the bits to be stored in its read-and-write section; command C7 enables this memory to write data coming from connection 15 at the address contained in the bit configuration present on connection 20.

At an output connection 16 there is always present the bit configuration stored in memory MD at the address present on connection 20.

A buffer register RG temporarily stores, on the basis of a command C8 coming from register P, the configuration of bits present on its input tied to connection 16; this configuration is maintained available at an output connection 22 until the next command C8.

Reference M denotes a conventional multiplier designed to multiply the configuration of bits present at a first input thereof, joined to connection 16, by the configuration of bits present at a second input joined to connection 22.

The result of such multiplication is presented, through a connection 23, to register RD which memorizes it in the presence of a command C4 coming from register P. Such a result is always present at the output of register RD, connected to one of the inputs of multiplexer MX through multiple 17, until a new command C4 arrives.

Blocks RG, M, RD together form a multiplying assembly BM, inserted between connections 16 and 17, to which reference will be made later in reviewing the overall operations of these blocks.

Subunit UT consists essentially of a crystal-controlled digital oscillator OD which, in the example chosen assuming an in-line gross rate equal to 3,200 bits per second, operates at a basic frequency $f_0$ of 12,288 kHz, and of two branches of frequency dividers.

A first branch comprises a frequency divider DT, of step-down ratio 1:3, which generates the timing signal T1 having, in the chosen example, a frequency of 4,096 kHz; as already described, signal T1 times the operation of blocks SQ, P and AL.

A second branch comprises two cascaded frequency dividers DP and DF.

Divider DP is programmable in that its step-down ratio may be modified from time to time upon reception of a suitable correction signal emitted by calculator AL on connection 21. This divider receives from oscillator OD the basic frequency $f_0$ and carries out the division thereof by a suitable coefficient N, which in our example is 256, increased or decreased by a corrective factor $\epsilon$ which coincides with the correction signal present on connection 21; factor $\epsilon$ is automatically computed by calculator AL in modulus and sign at each symbol interval.

Divider DP yields a frequency $f_a$ which for $\epsilon << 1$ has the value:

$$f_a = f_0/N(1+\epsilon) \mp f_0/N - \epsilon(f_0/N) \mp 48 \, (1-\epsilon)$$

Divider DF receives the frequency $f_a$ and generates the three timing signals T2, T3, T4.

Signal T2 has a frequency equal to $f_a/6$, which corresponds to $8(1-\epsilon)$ kHz, and controls blocks SQ, A/D and D/A (FIG. 2).

Signal T3 has a frequency $f_a/20$, which corresponds to $2.4(1-\epsilon)$ kHz, and controls in registers RI and RU (FIG. 2) the data synchronization from and to terminal TD2 at the subscriber's bit rate.

Signal T4 has a frequency $f_a/120$, which corresponds to $0.4(1-\epsilon)$ kHz, and synchronizes in registers RI and RU the signaling information from and to terminal TD2 at the envelope frequency, known to be equal to 1/6 times the net subscriber's bit rate.

The aforestated term $\epsilon(f_0/N)$ represents a small frequency shift with respect to the basic frequencies of signals T2, T3, T4 and serves to change the sampling frequency of the incoming signal, present on connection 3 (FIG. 1), so as to place the local timing in both frequency and phase under the control of the network clock.

This control is realized through the digital phase-locking loop consisting of subunit UT, its output connection carrying signal T2, blocks SH and A/D (FIG. 2), subunit UE and connection 21 which feeds back the correction signal to subunit UT.

The feedback branch of the loop is constituted by the programmable frequency divider DP and the fixed frequency divider DF, which generate the variable-frequency signal T2 allowing the incoming signal on line 3, CF, 4 to be sampled at the optimum instant.

As already noted, component AC needs no phase-locking loops; consequently, the programmable divider DP of FIG. 3 may be replaced in that component by a fixed frequency divider duly synchronized with the signal coming from unit OC (FIG. 1).

Figure 4:
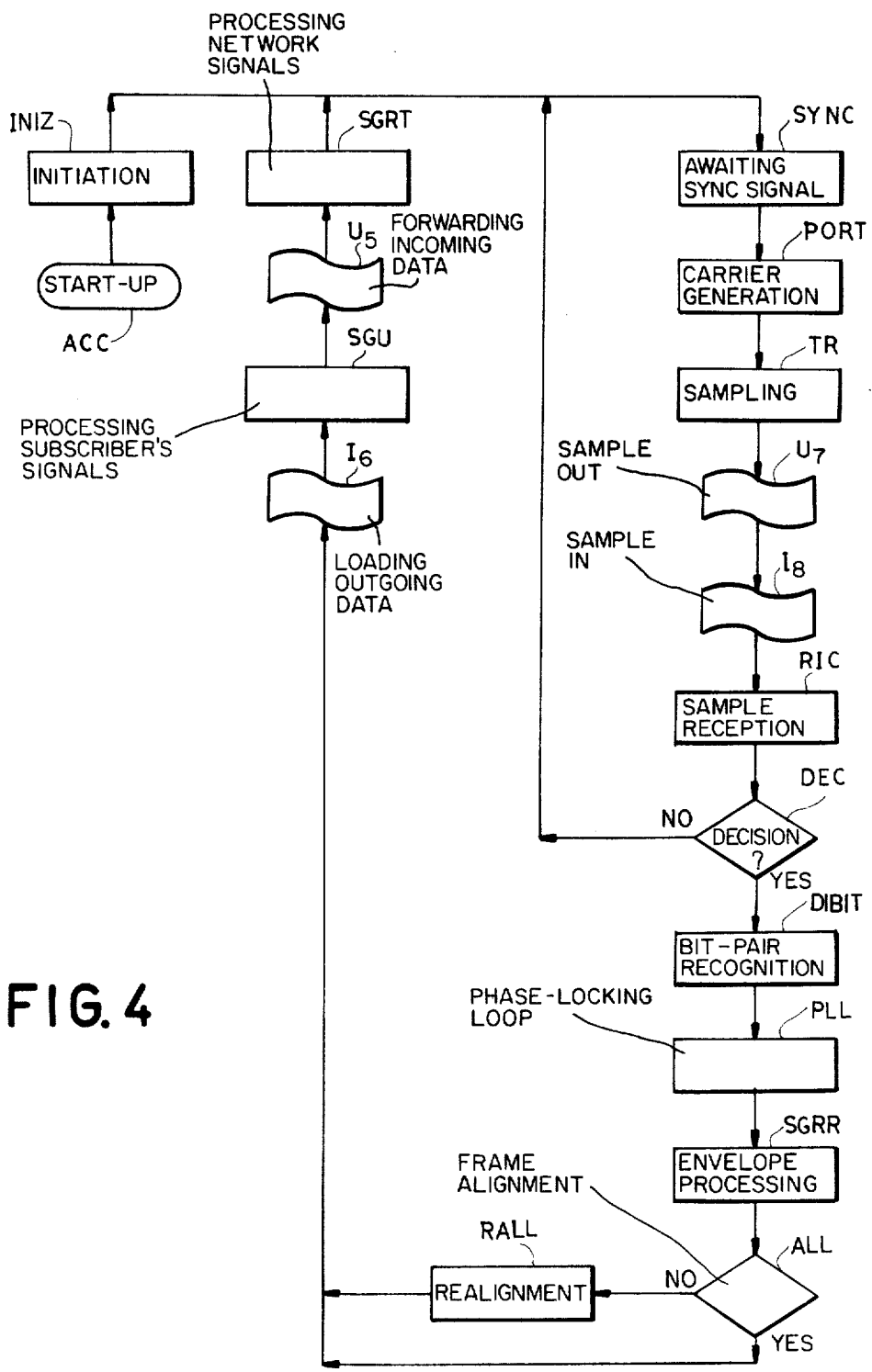
FIG. 4 is a flow chart describing the operation of the logic unit of FIG. 3.

FIG. 4 shows, in time sequence, the operating phases of logic unit UM represented in FIG. 3. The notations contained in the flow chart of FIG. 4 having the following meaning:

ACC—start-up of the equipment;
INIZ—initiation phase;
SYNC—waiting for synchronism signal, coincident with leading edges of pulses T2;
PORT—carrier generation; in the chosen example the carrier has a frequency equal to 1,800 Hz;
TR—generation of the sample of the modulated signal to be sent onto the line;
$U_7$—emission to converter D/A (FIG. 2) of the outgoing sample generated in the previous phase TR;
$I_8$—loading of the sample of the incoming modulated signal arriving from the line through converter A/D;
RIC—reception and demodulation of the incoming sample loaded in the previous phase;
DEC—check whether conditions essential to the recognition of the optimum decision instant are satisified, with return to phase SYNC if they are not;
DIBIT—decision and recognition of the received bit pair (as will be seen later, the modulation system here adopted groups the information relating to two bits into a single symbol);
PLL—extraction of synchronism via phase-locking loop from samples loaded during phase $I_8$ and processed during phases RIC, DEC, DIBIT;
SGRR—processing of an 8-bit envelope received from network;
ALL—check whether the condition of synchronism on a frame consisting of a sequence of received envelopes is satisfied, with transition to phase RALL if it is not;
RALL—restoration of the frame-synchronism condition;
$I_6$—loading of outgoing data and signalization commands from register RI (FIG. 2);
SGU—processing of subscriber's signalization;
$U_5$—emission toward subscriber, through register RU, of incoming signalization commands and data;
SGRT—processing, during transmission, of network signalization with organization of outgoing 8-bit envelope to be emitted toward the network.

The time interval necessary to traverse any loop represented in FIG. 4 is always equal to a period of signal T2, i.e. 125 microseconds.

We shall now describe, with reference to the drawing, the operation of the entire apparatus and more particularly of the microprogrammed unit UM embodying our invention.

It will be assumed, by way of example, that a four-phase differential-modulation system (DPSK) with modulation speed of 1,600 baud is used, with transmission of the information by 2 bits per symbol (dibit transmission), corresponding to the aforementioned transmission rate of 3,200 bit/sec. Thus, from the sampling by signal T2 at a frequency of 8 kHz, five samples per symbol are obtained since the recurrence rate of the symbols is 1,600 Hz. The letters DPSK stand for "DIFFERENTIAL-PHASE-SHIFT KEYING".

The carrier frequency is supposed to be of 1,800 Hz as stated above; by adopting a spectral shaping with partial attenuation reduction (roll-off) of 50%, we obtain a modulated signal in a frequency band between 600 Hz and 3,000 Hz.

In the microprogrammed unit UM, all operations relating to carrier generation, modulation and demodulation of the DPSK signal, synchronism extraction from the received signal and locking of the transmitting section thereto are carried out wholly digitally, under the control of the microprogram executed by subunit UC (FIG. 3).

Subscriber equipment AU (FIG. 1), as already described, carries out the double function of modulation/demodulation of data signals and of processing the signalization coming from the network and from the subscriber; the former takes place between phases PORT (FIG. 4) and DIBIT, whereas the latter occurs between phases PLL and SGRT.

Exchange equipment AC (FIG. 1) does not undertake, as already mentioned, any signalization processing but performs only a modulation/demodulation operation, again between phases PORT and DIBIT, and acts also as a pure interface between the line and exchange equipment OC by functioning, for data only, in two phases analogous to the ones described for phases $I_6$ and $U_5$.

The operation of equipment AU (FIG. 1) will be discussed with reference to the flow chart of FIG. 4.

The first two phases ACC and INIZ are obvious and common to all logic apparatus; thus, they will not be further described.

If there are no connections in progress, component AU (FIG. 1) emits and receives continuously a predetermined bit sequence to and from the line 3, CF, 4 consisting, e.g. in the transmission mode, of an 8-bit envelope having the following structure:

the first bit (F) is alternatingly "0" and "1" and is used for frame synchronism;

the 2nd through 7th bits have the binary value "1" to indicate that the subscriber's terminal equipment TD2 is available (free);

the 8th bit is "0" to indicate that no data transmission is in progress.

At the beginning, microprogrammed unit UM of component AU generates by itself the bits of the envelope referred to; then, during phases PORT and TR (FIG. 4), component AU groups them into dibits and modulates them according to the DPSK system, thereby generating digital samples representing the amplitude of the DPSK signal.

The actual computation of each of these samples is performed as described hereinafter.

In phase PORT there is calculated in network AL the address of the ROM section of memory MD containing the two samples expressing the precalculated instant digital value of sine and cosine of the sinusoidal carrier. These values are transferred, via connections 16, 18, 19 and blocks MX and SC, to calculator AL which makes them available at its output connection 15 for entry, in response to command C7, in the RAM section of memory MD, at the addresses previously supplied by the calculator on connection 20.

In the subsequent phase TR, signal modulation is carried out.

The ROM section of memory MD contains, among the constants recorded there, all the samples of the output of a shaping filter for the outgoing signal, designed to limit the bandwidth of the signal and operating at a sampling frequency of 8 kHz.

For technical design reasons, such a shaping is carried out on the modulating signal rather than on the modulated signal, i.e. in baseband.

This modulation requires a transfer into the shifted band which, as is generally the case in telephone-channel modems, has a central frequency of 1,800 Hz.

Such a transfer, as will be more fully explained hereinafter, is obtained by multiplying, at a rate of 8 kHz, two of the samples of the shaping filter by the corresponding in-phase (cosine) and quadrature (sine) samples of the carrier of 1,800 Hz, calculated in the phase PORT and stored in another portion of the RAM section of memory MD.

For these operations, the addressing of memory MD is calculated in network AL in the phase TR, on the basis of the information conveyed by command C1 (FIG. 3) and signal S, and sent to memory MD via connection 20.

More particularly, still in phase TR, the first filter sample relating to the sequence of the less significant bits of the dibits is first addressed in reading, then the bits of this sample are read out on connection 16 (FIG. 3), but they are only entered in register RG in response to command C8.

Subsequently, calculator AL supplies the address of the sine sample of the sinusoidal carrier which is sent to memory MD via connection 20; at the output connection 16 of this memory there appear the bits of the sample of the sine of the carrier, which are multiplied automatically in block M, in a combinatory manner, by the bits of the filter sample previously entered in register RG and presented to multiplier M on connection 22.

The bits resulting from this product are sent by multiplier M to register RD by way of connection 23 and are stored there in response to command C4.

Multiplexer MX, in response to command C3, selects connection 17 coming from register RD, extending it to its output connection 18, and the command C2 predisposes scaler SC to direct passage of the bits (weighting by $2^0$) from connection 18 to connection 19.

Upon the occurrence of command C1, calculator AL memorizes in one of its internal load registers the contents of the bits present at its input connection 19.

Calculator AL then addresses in memory MD through connection 20, for reading, the second filter sample relating to the sequence of the more significant bits of the dibits; analogously, these bits are read out on connection 16 and entered in register RG in response to command C8.

The address of the sample of the cosine of the carrier is supplied in like manner by calculator AL and sent to memory MD via connection 20; the bits relating to this sample are again sent to block M, via connection 16, and are there multiplied by the bits of the filter sample previously entered in register RG and presented to multiplier M on connection 22.

The product of the multiplication executed in block M is transferred by way of connection 23 to register RD and is stored there in response to command C4.

Since commands C3 and C2 have not changed in the interim, blocks MX and SC continue transferring bits present on connection 17 directly to calculator AL on connection 19.

Upon the occurrence of command C1, the bits present at the input connection 19 of the calculator are added to the contents of the aforementioned internal load register in which the resulting sum is memorized.

That sum is transferred from calculator AL first to multiplexer MX via connection 15 and subsequently, in response to selection command C3, from the multiplexer to weighting circuit SC via connection 18.

Circuit SC, in response to command C2, subjects that sum to an 8-bit downshift toward the less significant positions, i.e. divides it by $2^8$, so as to displace the more significant bits toward the less significant portion of the configuration; this displacement operates as an adjustment to the capacity of converter D/A which operates on configurations having a number of bits less than that handled by calculator AL.

In this way the calculator prepares a sample of the DPSK signal to be transmitted to the line through connections 15 and 7.

In calculator AL there is thus present a bit configuration which is obtained from the sum of the products of multiplication of two samples of the signal-shaping filter by the corresponding sine and cosine samples of the carrier.

The DPSK sample so obtained is the first among the five samples relating to the symbol comprising the first dibit of the envelope described above for the situation in which no connections are in progress.

The actual emission of this sample occurs during phase $U_7$ to converter D/A via connections 15 and 7.

As already mentioned, each sample is emitted at a rate of 8 kHz and is subsequently converted into analog form by element D/A (FIG. 2), filtered for the necessary interpolation by element FU, and sent as an analog signal to line 3.

The next sample will be the second among the five samples relating to the same first dibit; then follows the third of these five samples, and so on to the sixth sample which will be the first among the five samples of the second dibit, and so forth.

The transmission of the envelope so obtained will be completed when twenty samples are transmitted, i.e. five samples for each of the four dibits of the envelope.

Within the 125-μsec period of signal T2, besides this transmission mode, component AU may receive and process a DPSK signal coming from line 3.

More particularly, this incoming DPSK signal, which is transferred along the line in analog form, is filtered from noise in element FI, is sampled and kept at a rate of 8 kHz (signal T2) in circuit SH, is converted into digital form by element A/D and is then sent to multiplexer MX (FIG. 3) via connection 8.

In phase $I_8$ (FIG. 4) there is present on connection 8 a parallel bit configuration which digitally represents the amplitude and the sign of one of the samples obtained from circuit SH.

Still in phase $I_8$, command C3 (FIG. 3) causes multiplexer MX to select the input tied to connection 8 whereas command C2 maintains in scaler SC the direct link between connections 18 and 19.

The command C1 then instructs calculator AL to transfer the bits of the received sample, present at its input 19, to output 15.

Thereafter, by way of connection 20, the calculator supplies to memory MD the address at which the bits present on connection 15 are to be written; this writing operation occurs subsequently in response to command C7.

The signal represented by the bit configuration just entered in memory MD must now undergo a baseband transfer, which is complementary to the transfer carried out in the transmission mode.

For this purpose it is necessary to multiply this bit configuration by the samples of sine and cosine of the carrier, corresponding to those already discussed in the description of the transmitting mode. Since a modulation of incoherent type is being carried out, filtering is required in order to eliminate the still existing second harmonic of the carrier frequency.

These multiplications are carried out by calculator AL in phase RIC (FIG. 4) by utilizing the assembly BM (FIG. 3) and blocks MD, MX and SC following a procedure perfectly analogous to the one previously described for the transmitting mode in connection with phase TR.

Still in phase RIC, the filtering operation is performed on both the in-phase (cosine) and quadrature (sine) branches of the product of the incoming signal, written in memory MD, and the samples of cosine and sine of the carrier. This is done by two transversal filters, identical for the two branches, each having a predetermined number L of intermediate taps.

Filter coefficients are stored in a different area of the ROM section of memory MD.

In a different area of the RAM section of this memory there are stored, in suitable cells, two sets of L samples each, representing the product of the value of the received signal, sampled at L successive instants 125 μsec apart, multiplied by L samples of the sinusoidal carrier (in-phase and quadrature) also supposed to be sampled every 125 μsec, as already described.

The filtering operation is carried out in calculator AL by adding up the products of the filter coefficients times the contents of the aforementioned storage cells of the RAM section of memory MD; these cells practically form the delay line of the filter.

The results of the filtering of the in-phase branch as well as of the quadrature branch are stored in this RAM section. At this point there thus are present in the RAM section two samples of the signal received and retransferred to the baseband, i.e. one obtained from the in-phase branch and the other obtained from the quadrature branch. The two samples remain in the RAM section for one symbol duration in order to be compared with the samples which will be processed after five periods of the 8-kHz timing signal T2.

This comparison, as is known in the art, is designed to extract information concerning phase shifts between successive symbols of the incoming DPSK signal so as to recover the dibit relating to the received symbol. In practice, the comparison is made between the results of the filtering (in-phase and quadrature) of the present sample and the filtering results loaded five samples before.

To carry out this comparison, calculator AL, assembly BM and memory MD co-operate, still in phase RIC (FIG. 4), in a series of cross-multiplications and subsequent additions according to the aforedescribed procedure so as to implement the functions of a conventional comparison detector.

At the end of the detection procedure, two samples are present in respective registers of calculator AL. Each sample represents the demodulated signal relating to one of the two bits of the dibit which is being received; this demodulated signal may also be used to visualize the well-known eye diagram.

Thus, the function of demodulation relating to phase RIC is completed, yet a decision on the received dibit is carried out only during the subsequent phases DEC and DIBIT about to be described.

In phase DEC, network AL (FIG. 3) calculates the derivative of each of the two demodulated signals obtained at the end of the previous comparison operation. In practice, this derivative is computed as an incremental ratio between the sample of the presently demodulated signal and the sample of the signal which has been demodulated two periods earlier of the 8-kHz signal T2; that ratio is proportional to the derivative computed in the intervening sample.

The computation of the derivative is carried out by calculator AL and memory MD which correlate this derivative with the middle sample by multiplying it by the sign of the latter so as to make the information relating to the derivative independent of the sign of the demodulated signal.

The two correlated derivatives obtained from the two demodulated signals are added together by calculator AL in order to produce a single resulting derivative, proportional to the arithmetic mean of the two correlated derivatives, for the two in-phase and quadrature branches.

Obviously, as is true of the demodulated signals, the resulting derivative also consists of a discrete sequence of digital values which follow one another at the pulse rate of signal T2 and are associated in groups of five with each received symbol.

From the five digital values of each symbol there are thus obtained five new values (derivative samples) constituting the mean of the derivative at as many sampling instants. In practice, this mean is calculated by block AL and memory MD which co-operate in the establishment of a recursive low-pass filter of the 1st order with suitable time constant.

The optimum decision instant, as is known in the art, coincides with the point of maximum opening of the eye diagram.

Thanks to the availability of the derivative of the demodulated signal which determines this diagram, the maximum-opening condition for the eye is transformed into the condition of zero derivative occurring at a point where its slope is negative, thereby indicating a signal peak which is independent of polarity in view of the aforedescribed multiplication by the sign of the middle signal sample. Thus, it will suffice to identify the derivative sample having a value closest to zero among the five samples of the derivative referred to above, provided it is preceded by a positive derivative sample and followed by a negative one.

To malke this choice, calculator AL compares in each period of signal T2 (i.e. every 125 microseconds) the just computed derivative sample with the two preceding samples previously stored in memory MD.

This comparison is made as follows. If A, B and C be the respective values of the just computed derivative sample, the immediately preceding one and the one before that, the occurrence of the following four conditions must be verified in phase DEC:

(a) $A < 0$
(b) $C \geq 0$
(c) $|B| \leq |A|$
(d) $|B| < |C|$

Whenever calculator AL detects the absence of one of these four conditions, phase DEC (FIG. 4) is left by the path NO and phase SYNC is resinstated in order to process the subsequent incoming or outgoing DPSK sample.

Otherwise, the path YES is followed with passage to phase DIBIT.

Obviously, if one out of five derivative samples is to be chosen, path NO must be followed four times and path YES once every symbol interval.

In phase DIBIT, calculator AL makes the decision on the received dibit and accepts as optimal instant for the decision itself the one corresponding to the peak-indicating derivative sample B, i.e. the middle one of the three samples which have satisfied the aforestated four conditions.

Then follows phase PLL in which calculator AL, on the basis of the modulus and the sign of the derivative sample B, generates the corrective factor $\epsilon$, already described, which is sent to subunit UT via connection 21.

More particularly, the calculator compares the modulus of sample B with a predetermined threshold. If that threshold is not exceeded, it means that in the considered symbol period no correction is needed and signal $\epsilon$ is given the value zero; if, on the contrary, the threshold is exceeded, calculator AL examines the sign of sample B and allots it to signal $\epsilon$ which will assume a predetermined modulus value.

The corrective operation carried out by signal $\epsilon$ on the timing of pulse T2, which controls the sampling of the incoming line signals, minimizes as a consequence the value of the modulus of the derivative sample B considered, determining the decision instant; this ensures that the decision instant corresponds to the instant of maximum eye opening.

The modulation/demodulation performed by the equipment is now terminated. Thereafter, phase SGRR and the following ones are executed during which the signalization originating at the subscriber station and at the network is processed.

At this point, if the initially considered condition persists in which no connections are in progress or are being formed, the above-described outgoing envelope (F1111110) is confirmed, and the dibit just recognized and decided co-operates in the formation of the incoming envelope having the same format (F1111110).

Otherwise, i.e. if a connection is in progress or is being formed or released, the envelope, on reception as well as on transmission, assumes another configuration; more particularly:

the first bit (F) is always alternatingly "0" and "1" and is utilized for frame synchronization;

bits Nos. 2 through 7 may be of either logical value in various combinations, forming data transmitted or received, or predetermined binary configurations forming signalization messages sent from network NRD (FIG. 1) to equipment AU or vice versa;

the 8th bit is "1" when data transmission is in progress, i.e. when the configuration of the 2nd through 7th bits represents information, and is "0" when those bits constitute a signalization message.

Phases SYNC to PLL (FIG. 4) are all executed in the manner already described even when a connection is in progress or is being formed or released, i.e. when the envelopes have the structure just discussed.

In phase SGRB, calculator AL (FIG. 3) examines bit by bit the received dibit to decide its location within the incoming envelope.

To establish this location, calculator AL counts, with modulus 8, the number of received bits; upon determining the position of the received bit within the envelope, the calculator behaves in a manner about to be described.

If, on the basis of such counting, the received bit is assumed to be the frame-synchronization bit F, calculator AL, in conjunction with memory MD, starts a checking procedure of frame alignment of the received envelopes; this procedure, basically consisting in verifying the alternation of "0" and "1" for consecutive bits F, takes place during phase ALL.

To avoid alignment losses due to possible demodulation errors, calculator AL extends the checking of this alternation to a suitable number of envelopes—greater than two—and decides only after a predetermined number of violations of this law of alternation that nonalignment exists.

More particularly, when such nonalignment condition is revealed, a transition occurs from phase ALL via path NO to phase RALL which will be examined hereinafter. Otherwise, i.e. under alignment conditions, the system passes from phase ALL along the path YES to phases $I_6$, SGU, $U_5$, SGRT, which in the case of bit F do not carry out any processing operation; then the phase SYNC is again reached for processing subsequent bits.

In phase RALL recovery of frame alignment is accomplished by shifting the modulus-8 counter contained in calculator AL by one position, so that the next-following bit may be processed as a bit F.

If, with every envelope, this latter bit (termed "trace bit") satisfies the condition of alternation of "0" and "1" for a predetermined number of times, it is recognized as a true bit F and thus the alignment is regarded as re-established.

Obviously, this detection operation is effected for a number of received envelopes higher than 2 and involves as many repetitions of phases ALL and RALL.

If, on the contrary, this trace bit does not verify an alignment condition, the procedure is continued by further shifts of the modulus-B counter of calculator AL until a trace bit satisfying that condition is found.

Bits Nos. 2 through 8 of each received envelope are recognized on the basis of the counting operation carried out by calculator AL on bits received in phase SGRR, as described above, and are written in the RAM section of memory MD. As to bits Nos. 2 through 7, pases ALL, RALL, $I_6$, SGU, $U_5$, SGRT are executed without carrying out any processing operation; for bit No. 8 only phases ALL and RALL are carried out without processing.

Let us now consider the exchange of information passing from interface IN (FIG. 2) to unit UM through register RI.

In phase $I_6$, data bits present on connection 11 are loaded by calculator AL via blocks MX and SC, and signalization bits present on connection 12 are transferred to sequencer SQ.

In phase SGU, the subscriber's signalization is processed on the basis of the bits loaded during the preceding phase $I_6$ and of the envelope received from the line and loaded in phase SGRR.

More particularly, the bits present on connection 12 determine the addressing of memory MM by sequencer SQ since the microinstruction emitted by this memory on connections 10 and 14, and thus the entire subsequent progression of the microprogram, depends upon the signalization information coming from the subscriber by way of register RI.

Besides, if the logical value of bit No. 8 of the envelope received from the line is "0", bits Nos. 2 through 7 of that envelope are being recognized as signalization bits; this recognition enables the decoding of the received signalization information and the making of suiable decisions.

In phase $U_5$ the bits processed in the previous phase SGU are sent to the subscriber through register RU and interface IN.

In phase SGRT, on the basis of the information used for conditioning the processing in phase SGU, either the network signalization is processed in a transmitting mode or the 8-bit envelope to be transferred to the line is organized and stored in memory MD.

The latter envelope, divided into four dibits, will be utilized in the four subsequent symbol times in phase TR, for emitting the DPSK signal toward the line according to the above-described procedure.

What we claim is:

1. Terminal equipment communicating with a data network by way of a transmission link designed for a carrier wave modulated by a succession of binary signals forming multibit envelopes each consisting of a predetermined number of said binary signals and having a characteristic bit in a predetermined time position, comprising:

receiving means for deriving a succession of analog samples at predetermined intervals from an incoming modulated carrier wave, said binary signals recurring during time periods of predetermined length each encompassing a multiplicity of sampling intervals;

analog/digital conversion means connected to said receiving means for translating said analog samples into digitized form;

memory means for storing precalculated digital values of trigonometric functions of amplitude samples of a predetermined carrier oscillation;

arithmetic means connected to said analog/digital conversion means and to said memory means for demodulating the incoming carrier wave by performing mathematical operations on the digitized samples, including multiplication thereof by the corresponding stored digital values to produce a series of signal samples during each of said time periods, and reconstructing the original binary signals from the results of said operations by selecting during each of said time periods the signal sample of highest absolute value in the series, said highest absolute value being determined by said arithmetic means from a calculation of the derivatives of said signal samples, said arithmetic means including a threshold comparator emitting an error signal upon detecting a magnitude of the derivative of said signal sample of highest absolute value exceeding a predetermined level;

a generator of timing pulses establishing said sampling intervals, said generating being responsive to said error signal for modifying the cadence of said timing pulses to resynchronize same with the timing of said data network; and a microinstruction emitter stepped by said timing pulses and programmed to control said arithmetic means with detection of said characteristic bit among the reconstructed binary signals to reconstitute said envelopes.

2. Terminal equipment as defined in claim 1 wherein said arithmetic means comprises a multiplier with input means connected to said memory means, a calculator connected to receive digital information from said multiplier and determining said trigonometric functions, a feedback connection from said calculator to said memory means, and a weighting circuit inserted between said multiplier and said calculator for selectively dividing certain multiplication products by a predetermined constant under the control of said microinstruction emitter.

3. Terminal equipment as defined in claim 2 wherein said memory means includes a read-only section containing filtering coefficients and a read-and-write section receiving calculation results from said feedback connection, said filtering coefficients relating to bits of envelopes modulating an outgoing carrier wave.

4. Terminal equipment as defined in claim 3 wherein said input means includes a first multiplier input, connected directly to said memory means for receiving said stored digital values therefrom, and a second multiplier input, connected to said memory means via a register for the temporary storage of filtering coefficients extracted from said read-only section during modulation of an outgoing carrier wave.

5. Terminal equipment as defined in claim 1, 2, 3 or 4 wherein said microinstruction emitter is programmed to control said arithmetic means for producing derivative samples, representing the magnitude and the sign of the slope of respective signal samples, from a comparison of non-consecutive signal samples and selecting as the signal sample of highest absolute value a signal sample associated with a derivative sample which is bracketed by an immediately preceding and an immediately succeeding derivative sample of mutually opposite signs and of absolute magnitudes exceeding that of the intervening derivative sample.

6. Terminal equipment as defined in claim 5 wherein said generator comprises an oscillator and an adjustable frequency divider connected to said oscillator, said frequency divider having a control input connected to receive said error signal for varying its step-down ratio.

7. Terminal equipment as defined in claim 2, 3 or 4, further comprising a source of bit groupings to be modulated upon an outgoing carrier wave, multiplexer means controlled by said microinstruction emitter for alternately feeding digitized samples from said analog/digital conversion means and bit groupings from said source to said calculator, said digital/analog conversion means inserted between said calculator and said link for translating output signals from said calculator into a modulated carrier wave under the control of said timing pulse.

* * * * *